(12) United States Patent
Combee

(10) Patent No.: US 8,614,580 B2
(45) Date of Patent: Dec. 24, 2013

(54) DYNAMICALLY ACTIVATING DIFFERENT SUBSETS OF A PLURALITY OF ELECTRODES

(75) Inventor: Leendert Combee, Sandvika (NO)

(73) Assignee: WesternGeco L.L.C., Houston, TX (US)

( * ) Notice: Subject to any disclaimer, the term of this patent is extended or adjusted under 35 U.S.C. 154(b) by 490 days.

(21) Appl. No.: 12/966,625

(22) Filed: Dec. 13, 2010

(65) Prior Publication Data

US 2012/0146650 A1 Jun. 14, 2012

(51) Int. Cl.
*G01V 3/08* (2006.01)

(52) U.S. Cl.
USPC .......................................... 324/365; 324/347

(58) Field of Classification Search
USPC ........................................................ 324/365
See application file for complete search history.

(56) References Cited

U.S. PATENT DOCUMENTS

| | | | | |
|---|---|---|---|---|
| 3,798,535 A | * | 3/1974 | Schuster | 324/373 |
| 4,295,096 A | * | 10/1981 | Sternberg et al. | 324/357 |
| 4,319,192 A | * | 3/1982 | Chemali et al. | 324/375 |
| 4,583,046 A | * | 4/1986 | Vinegar et al. | 324/373 |
| 4,633,182 A | * | 12/1986 | Dzwinel | 324/335 |
| 4,714,889 A | * | 12/1987 | Chapman et al. | 324/366 |
| 6,651,007 B2 | | 11/2003 | Ozbek | |
| 6,684,160 B1 | | 1/2004 | Ozbek | |
| 6,876,599 B1 | | 4/2005 | Combee | |
| 7,328,109 B2 | | 2/2008 | Iranpour | |
| 7,388,382 B2 | * | 6/2008 | Strack et al. | 324/368 |
| 7,446,535 B1 | | 11/2008 | Tenghamn | |
| 7,894,989 B2 | * | 2/2011 | Srnka et al. | 702/2 |
| 7,919,965 B2 | * | 4/2011 | Schaug-Pettersen et al. | 324/365 |
| 2008/0122444 A1 | | 5/2008 | Schaug-Pettersen | |
| 2010/0013485 A1 | * | 1/2010 | Alumbaugh et al. | 324/337 |
| 2012/0112752 A1 | * | 5/2012 | Campbell et al. | 324/332 |
| 2012/0146649 A1 | | 6/2012 | Combee | |
| 2013/0113489 A1 | * | 5/2013 | Guigne | 324/334 |

OTHER PUBLICATIONS

International Bureau of WIPO, International Appl. No. PCT/US2011/064177, International Preliminary Report on Patentability dated Jun. 18, 2013 (5 pages).

* cited by examiner

*Primary Examiner* — Jay Patidar

(57) ABSTRACT

To perform surveying of a subterranean structure, an electromagnetic (EM) source array has a plurality of electrodes. Different subsets of the electrodes are dynamically activated to provide corresponding EM radiation patterns to survey the subterranean structure.

19 Claims, 7 Drawing Sheets

DYNAMICALLY ACTIVATING DIFFERENT SUBSETS OF A PLURALITY OF ELECTRODES

BACKGROUND

Electromagnetic (EM) techniques can be used to perform surveys of subterranean structures for identifying elements of interest. Examples of elements of interest in a subterranean structure include hydrocarbon-bearing reservoirs, gas injection zones, thin carbonate or salt layers, and fresh-water aquifers.

One type of EM survey technique is the controlled source electromagnetic (CSEM) survey technique, in which an EM transmitter, called a "source," is used to generate EM signals. Surveying units, called "receivers," are deployed within an area of interest to make measurements from which information about the subterranean structure can be derived. The EM receivers may include a number of sensing elements for detecting any combination of electric fields, electric currents, and/or magnetic fields.

Traditionally, an EM source is implemented with two electrodes, one mounted on the front and one mounted on the aft of an antenna. The two electrodes of the EM source are connected to the "+" and "−" terminals of a power source system. However, this traditional arrangement of an EM source does not provide flexibility, particularly in marine survey applications.

SUMMARY

In general, according to an embodiment, a method of performing surveying of a subterranean structure includes providing an electromagnetic (EM) source array having a plurality of electrodes, and dynamically activating different subsets of the plurality of electrodes to provide corresponding EM radiation patterns to survey the subterranean structure.

Other or alternative features will become apparent from the following description, from the drawings, and from the claims.

DETAILED DESCRIPTION

Figure 1:
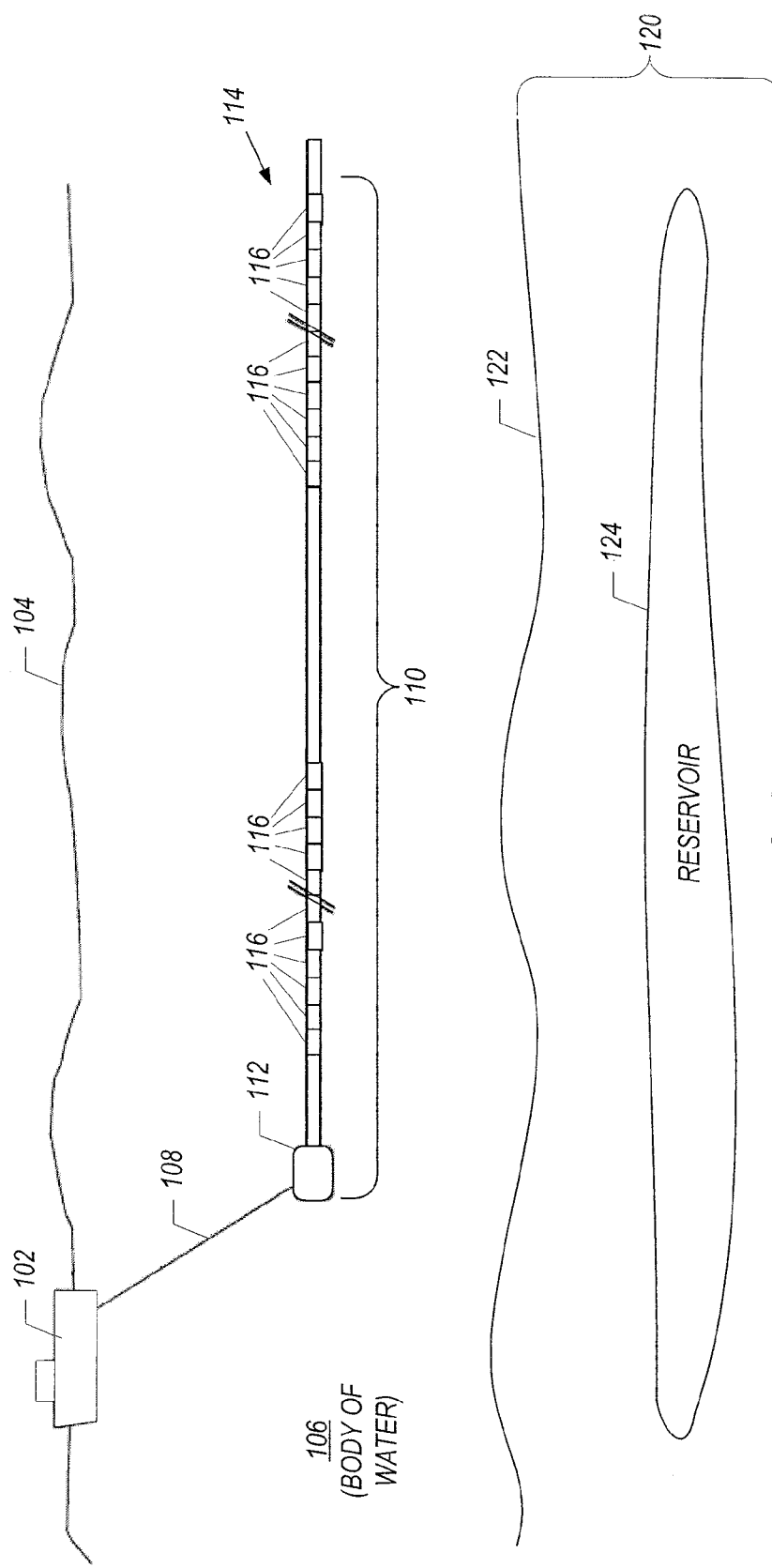
FIG. 1 is a schematic diagram of a marine survey arrangement that includes an electromagnetic (EM) source array according to an embodiment.

In the following description, numerous details are set forth to provide an understanding of the present invention. However, it will be understood by those skilled in the art that the present invention may be practiced without these details and that numerous variations or modifications from the described embodiments are possible.

In accordance to some embodiments, to perform a survey of a subterranean structure, an electromagnetic (EM) source array is provided that has multiple (greater than two) electrodes. In some embodiments, the survey is performed in a marine environment, in which the EM source array is deployed in a body of water to produce source EM signals to survey a subterranean structure underneath the body of water. Although reference is made to performing marine survey operations in this discussion, it is noted that EM source arrays according to some embodiments can also be used in land-based surveying.

Different subsets of the multiple electrodes can be dynamically activated to provide corresponding different EM radiation patterns to survey the subterranean structure. Each of the electrodes on the EM source array can be activated or deactivated at will, either by a human or by an automated system (e.g., a computer programmed to autonomously decide which electrodes to activate and which to deactivate). The automated system can dynamically select different subsets of electrodes to activate and deactivate based on various inputs (and predefined criteria). The decision can be based on inputs relating to the positions of electrodes, cable direction, navigation information, cable angle, and/or other information.

By being able to dynamically control the EM radiation pattern produced by the EM source array according to some embodiments, several applications can be provided. In a first application, even though the EM source array is towed through a body of water and moving at a certain velocity, dynamic activation of different subsets of the multiple electrodes of the EM source array can allow the EM source array to produce a radiation pattern that is fixed in space for a given time interval, even though the EM source array is moving.

In another application, the EM source array can be dropped to the water bottom surface (e.g., sea floor) of the marine environment to provide a fixed position of the EM source array. By being able to dynamically activate different subsets of electrodes in the EM source array, the EM radiation patterns produced by the EM source array can be made to appear to be produced by a moving source array even though the source array is fixed in position.

In yet another application, the EM source array can include multiple antenna sections that can be angled with respect to each other. By controlling which of the electrodes of the EM source array are activated, a radiation pattern with a vertical component or a horizontal component in the cross-line direction can be produced, which is not possible with a traditional EM source array that has just two electrodes towed to move in a horizontal direction.

Although several example applications are described, it is contemplated that other applications of the EM source array according to some embodiments are possible.

FIG. 1 illustrates an exemplary marine survey arrangement that includes a marine vessel 102 provided on a surface 104 of a body of water 106. An umbilical cable 108 is attached to the marine vessel 102, and is used to tow an assembly 110 that includes a control unit 112 and an EM source array 114. The EM source array 114 includes multiple EM electrodes 116 arranged along the axial (longitudinal) length of the EM source array 114. In one example, the EM source array 114 can be in the form of a cable on which are mounted the electrodes 116. In other implementations, the EM source array 114 can have other configurations. In some examples, the number of electrodes 116 provided in the source array 114 can be between 4 and 60, although other numbers of electrodes can be used in other implementations.

The electrodes 116 can be spaced apart uniformly or non-uniformly along the axial length of the source array 114. An EM electrode can be formed of an electrically conductive material such copper.

The control unit 112 is an electronic unit that is designed to be provided in the body of water 106. The control unit 112 provides power to the electronic devices of the source array 114, and communicates signaling with the electronic devices of the source array 114. Examples of electronic devices include the electrodes 116, navigation devices (e.g., birds to control the movement of the source array 114), compasses, pressure sensors, temperature sensors, conductivity sensors, and so forth. Also, the source array 114 can be provided with buoyancy elements to maintain the vertical position of the source array 114 in the body of water 106.

The control unit 112 converts the main power fed from the marine vessel 102 (through the umbilical cable 108) into a target waveform signal. Also, in accordance with some embodiments, the control unit 112 selects which of the electrodes 116 to activate and deactivate, such that different subsets of the electrodes 116 can be activated to produce corresponding EM radiation patterns.

Although not shown, the marine vessel 102 can also tow a cable that has EM receivers that are employed to detect EM signals affected by a subterranean structure 120 underneath a marine bottom surface 122 (e.g., sea floor). The subterranean structure 120 includes at least one subterranean element 124 of interest (e.g., a reservoir, a gas injection zone, a thin carbonate or salt layer, a fresh-water aquifer, and so forth). The EM signals affected by the subterranean structure 120 including the subterranean element 124 are detected by the EM receivers. The measurement data from the EM receivers are processed to characterize the content of the subterranean structure 120.

Figure 2A:
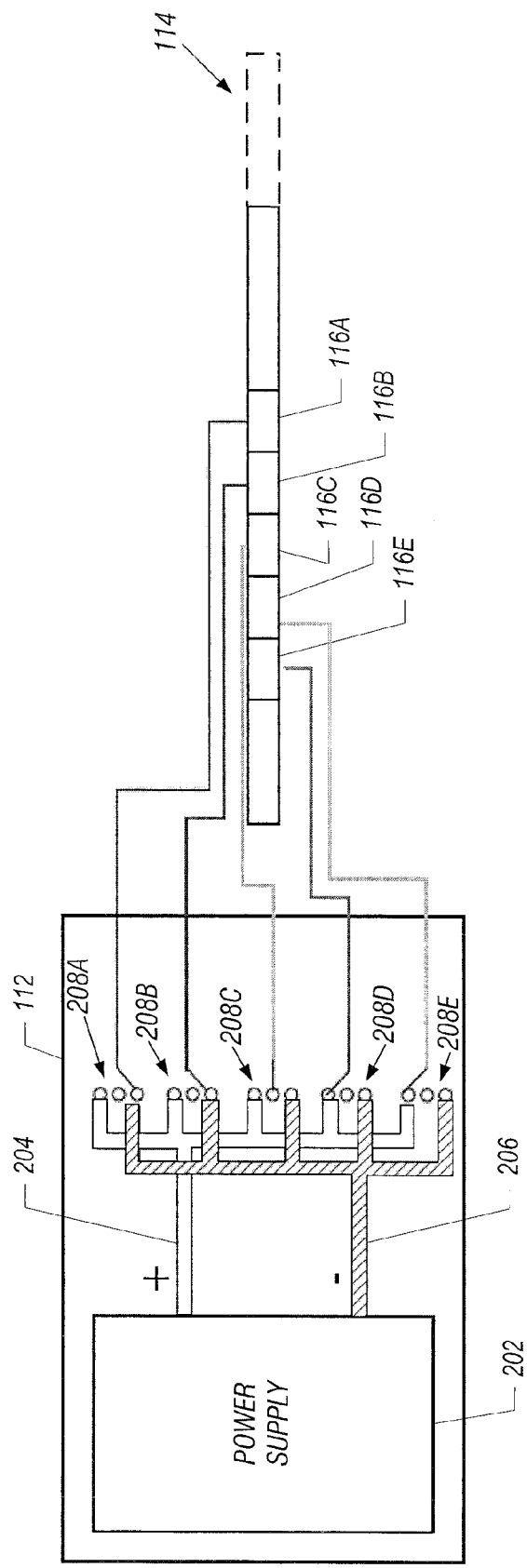
FIG. 2A is a schematic diagram illustrating connection of a power supply to the EM source array, according to an embodiment.

FIG. 2A illustrates components of the control unit 112 used for activation of the electrodes of the source array 114. The control unit 112 includes a power supply 202 that has a +output terminal 204 and a −output terminal 206. Different sets 208A, 208B, 208C, 208D, and 208E of contact terminals are provided, where each set of contact terminals is for connection to a corresponding electrode. Thus, in the example of FIG. 2A, the first set 208A of contact terminals is for connection to electrode 116A, the second set 208B of contact terminals is for connection to electrode 116B, the third set 208C of contact terminals is for connection to electrode 116C, the fourth set 208D of contact pins is for connection to electrode 116D, and the fifth set 208E of contact terminals is for connection to electrode 116E.

Each set 208A-208E of contact terminals is associated with a switch to selectively connect one of the contact terminals in the set to the corresponding electrode. Each set of contact terminals includes three contact terminals. In FIG. 2A, the contact terminals are represented by little circles. The upper contact terminal in the set is connected to the +output terminal 204 of the power supply 202, while the lower contact terminal in the set is connected to the −output terminal 206 of the power supply 202. The +output terminal 204 of the power supply 202 provides a positive voltage, while the −output terminal 206 of the power supply 202 provides a negative voltage. The middle contact terminal of each set is not connected and provides an off position.

The switch of each set is considered to be in the on-positive state if the switch is connected to the +output terminal 204 of the power supply 202; the switch is in the on-negative state if the switch is connected to the −output terminal 206 of the power supply 202, and the switch is in the off state if the switch is connected to the middle contact terminal. Depending on the position of the switch in each of the sets 208A-208E, the corresponding electrode 116A-116E is connected to one of the positive voltage, an off state, or the negative voltage.

In the example of FIG. 2, the electrodes 116A and 116B are connected to the contact terminals in sets 208A and 208B that are connected to the −output of the power supply 202, while the electrodes 116D and 116E are connected to contact terminals of sets 208D and 208E that are connected to the +output of the power supply 202. The electrode 116C is connected to the middle contact terminal of set 208C.

Figure 2C:
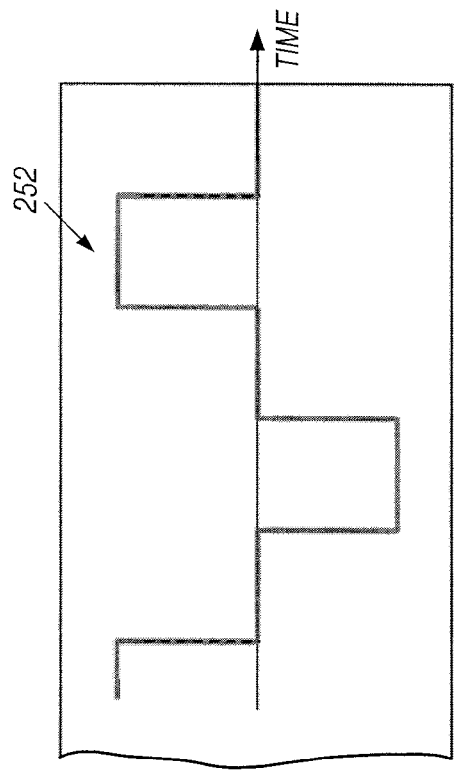
FIGS. 2B and 2C are timing diagrams of EM source waveforms useable with the EM source array according to some embodiments.
Figure 2B:
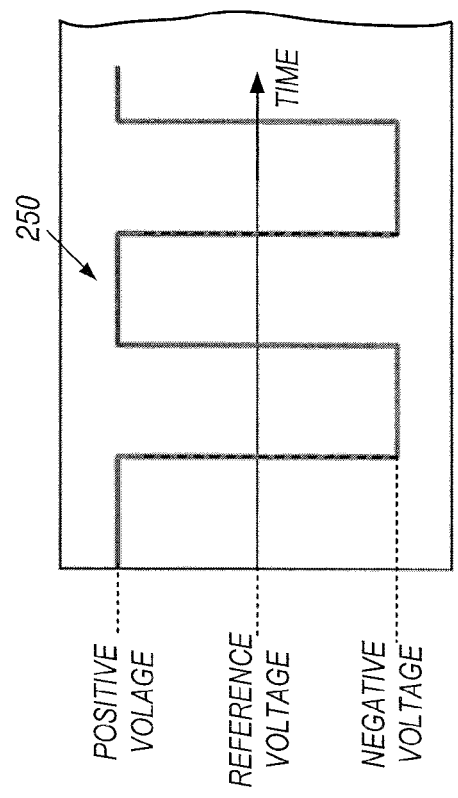

The switching between the on-positive state, on-negative state, and off state is governed by the desired CSEM waveform. FIG. 2B shows a waveform 250 that is a square waveform that varies between a positive voltage and a negative voltage to provide a square waveform. FIG. 2C, on the other hand, shows a waveform 252 that has three possible states: a positive voltage state, an off state, and a negative voltage state. The waveform that is used depends on the desired application. Each electrode shown in FIG. 2A is controlled to produce one of the waveforms shown in FIG. 2B or FIG. 2C, or another waveform.

Note that if a particular electrode is to be deactivated, then the switch of the corresponding set of contact terminals is set to be fixed at the off state. For example, in FIG. 2A, the electrode 116C can be the electrode that is maintained in the off state, since the switch in the set 208C of contact terminals is actuated to be connected to the middle contact terminal. The selection of which of the electrodes are to be activated or deactivated can be controlled by a human or by an automated system such as a computer.

Figure 3:
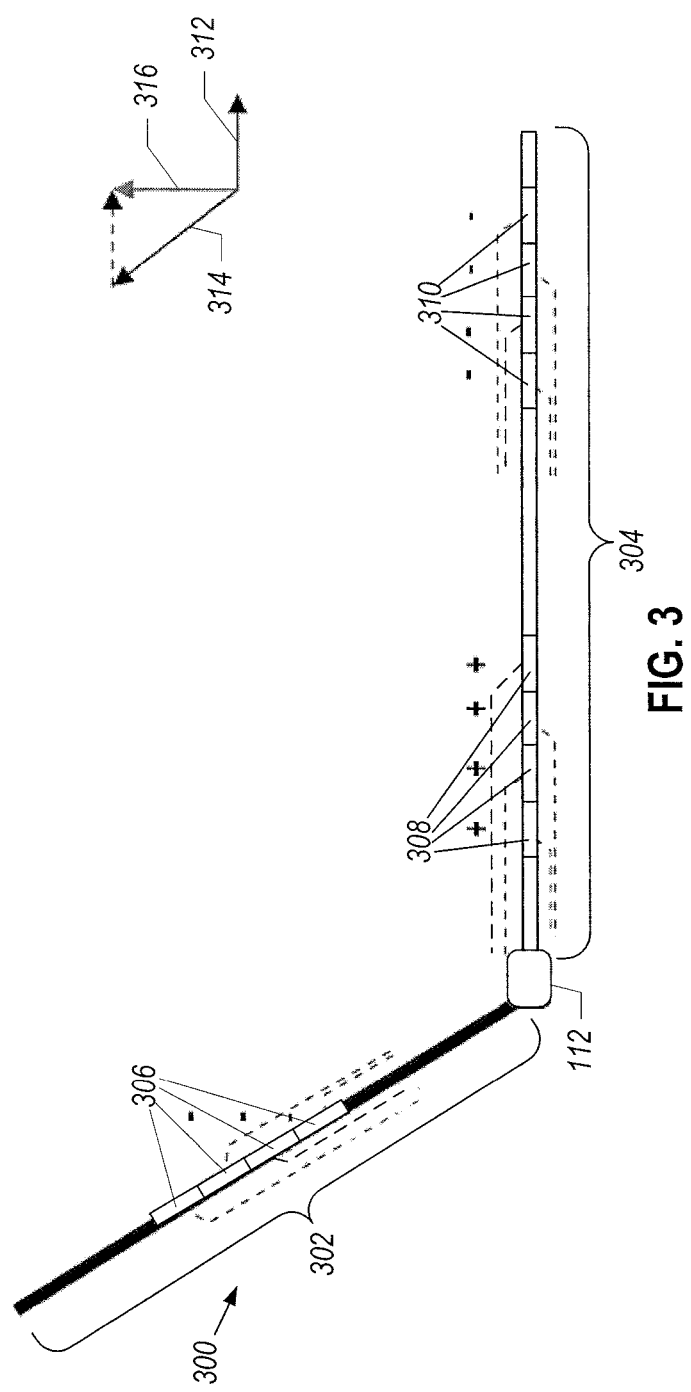
FIG. 3 is a schematic diagram of an EM source array having dynamically activatable electrodes, according to an alternative embodiment.

FIG. 3 illustrates a source array 300 according to a different embodiment that has multiple antenna sections 302 and 304, which are angled with respect to each other. In one embodiment, the antenna section 302 can be part of the umbilical cable 108 shown in FIG. 1. In an alternative embodiment, the antenna section 302 can be separate from (but attached to) the umbilical cable 108. Although just two antenna sections are shown in FIG. 3, it is noted that additional antenna sections can be provided in other implementations.

The antenna section 302 has a first set of electrodes 306, and the antenna section 304 has a second set of electrodes 308 and a third set of electrodes 310. Each of the electrodes 306, 308, and 310 is connected by a corresponding wire (represented by the dashed lines in FIG. 3 to the control unit 112).

In the example arrangement of FIG. 3, it is assumed that one of the electrodes 308 in the second set is connected to a positive voltage, while one of the electrodes 306 in the first set and one of the electrodes 310 in the third set are connected to a negative voltage. As a result, an electrical dipole 312 is developed between the activated electrode 308 and the activated electrode 310, while another electric dipole 314 is established between the activated electrode 308 and the activated electrode 306. An electric dipole is a separation of positive and negative charge. Note that the dipole 312 is generally in the horizontal direction, while the dipole 314 is in the diagonal direction.

Because of the presence of dipoles 312 and 314 in different directions, an effective dipole 316 that is a summation of the dipoles 312 and 314 is developed. Note that in the example of FIG. 3, the effective dipole 316 extends in a vertical direction—this dipole 316 can be referred to as a pseudo-vertical dipole because the EM source array is composed of two dipoles neither of which is truly vertical. By activating more or less electrodes in the antenna sections 302 and 304, the precise radiation pattern (vector sum) can be tuned.

By using the arrangement of FIG. 3, an effective vertical source can be provided, which can also be towed by a marine vessel in a marine survey arrangement. Typically, a vertical source cannot be towed.

Although reference is made to activating just one electrode in each of the three sets of electrodes shown in FIG. 3, it is noted that is also possible to activate more than one electrode in each of the sets of electrodes.

Figure 4:
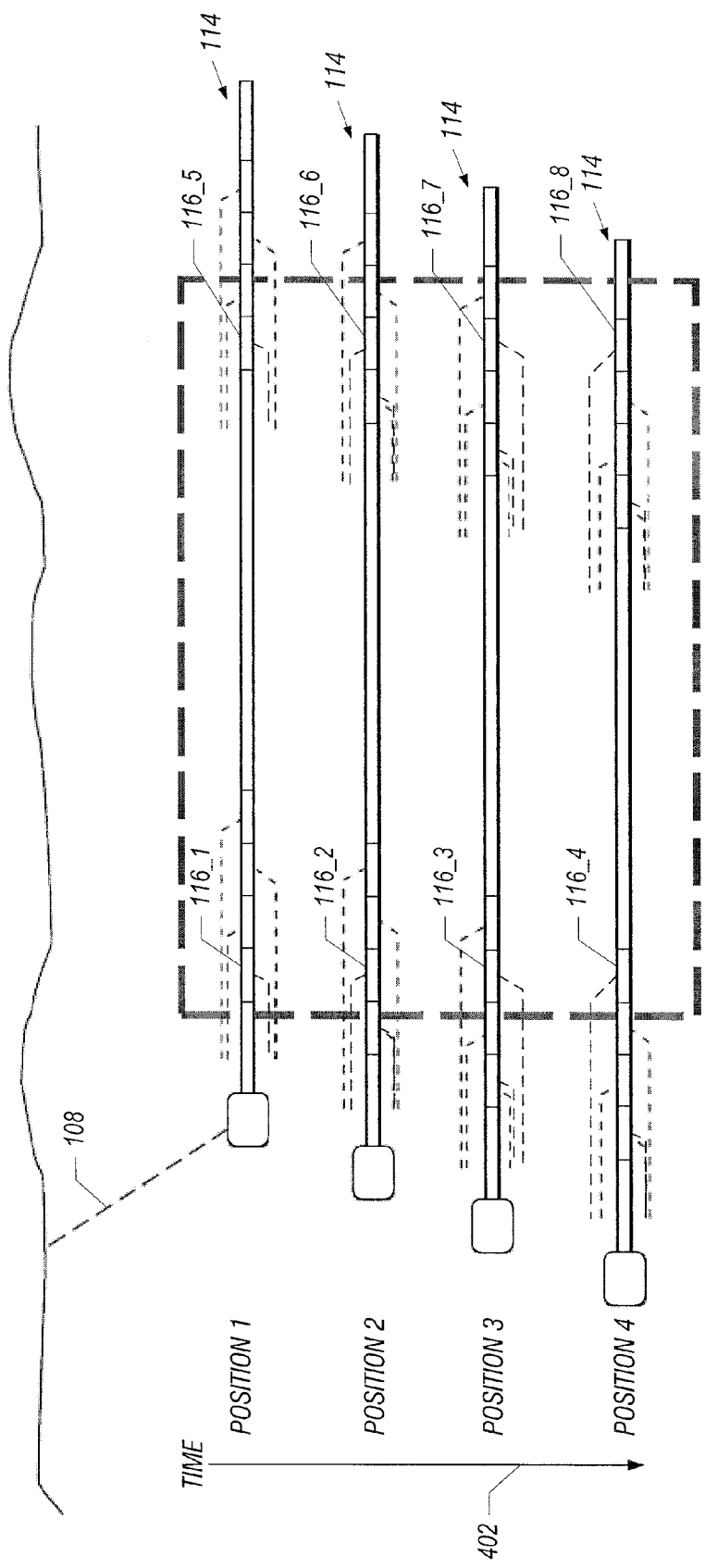
FIGS. 4-5 illustrate example EM source arrays to provide specific marine survey applications, according to some embodiments.

FIG. 4 illustrates a technique for producing a virtual stationary EM radiation pattern even though the source array 114 is being moved in a horizontal direction (such as due to the source array 114 being towed by the marine vessel 102 of FIG. 1). FIG. 4 shows four positions of the source array 114 over time (as represented by a time axis 402). Initially, in position 1, electrodes 116_1 and 116_5 are activated (and the other electrodes of the source array 114 are deactivated) to produce a dipole between the source electrodes 116_1 and 116_5. Subsequently, when the source array 114 has moved to position 2, electrodes 116_2 and 116_6 are activated, while the electrodes are deactivated. Note that due to movement of the source array 114, the positions of source electrodes 116_2 and 116_6 when the source array 114 is at position 2 are generally the same as the positions of corresponding electrodes 116_1 and 116_5 when the source array 114 was at position 1. Thus, the dipole developed between source electrodes 116_2 and 116_6 (when the source array 114 is at position 2) has the same radiation pattern as that produced by source electrodes 116_1 and 116_5 (when the source array 114 was at position 1).

Subsequently, when the source array 114 has been moved to position 3, source electrodes 116_3 and 116_7 are activated, while the remaining source electrodes are deactivated. Again, the positions of source electrodes 116_3 and 116_7 when the source array is at position 3, corresponds to the positions of electrodes 116_1 and 116_5 when the source array 114 was at position 1. Next, when the source array 114 has been moved to position 4, source electrodes 116_4 and 116_8 are activated, while the other electrodes are deactivated.

In this way, successive subsets of electrodes activated at different times are generally located at a target location. As a result, motion correction to correct for movement of the source array 114 is provided such that the subterranean structure being surveyed is exposed to substantially the same radiation pattern even though the source array 114 is moving.

Figure 5:
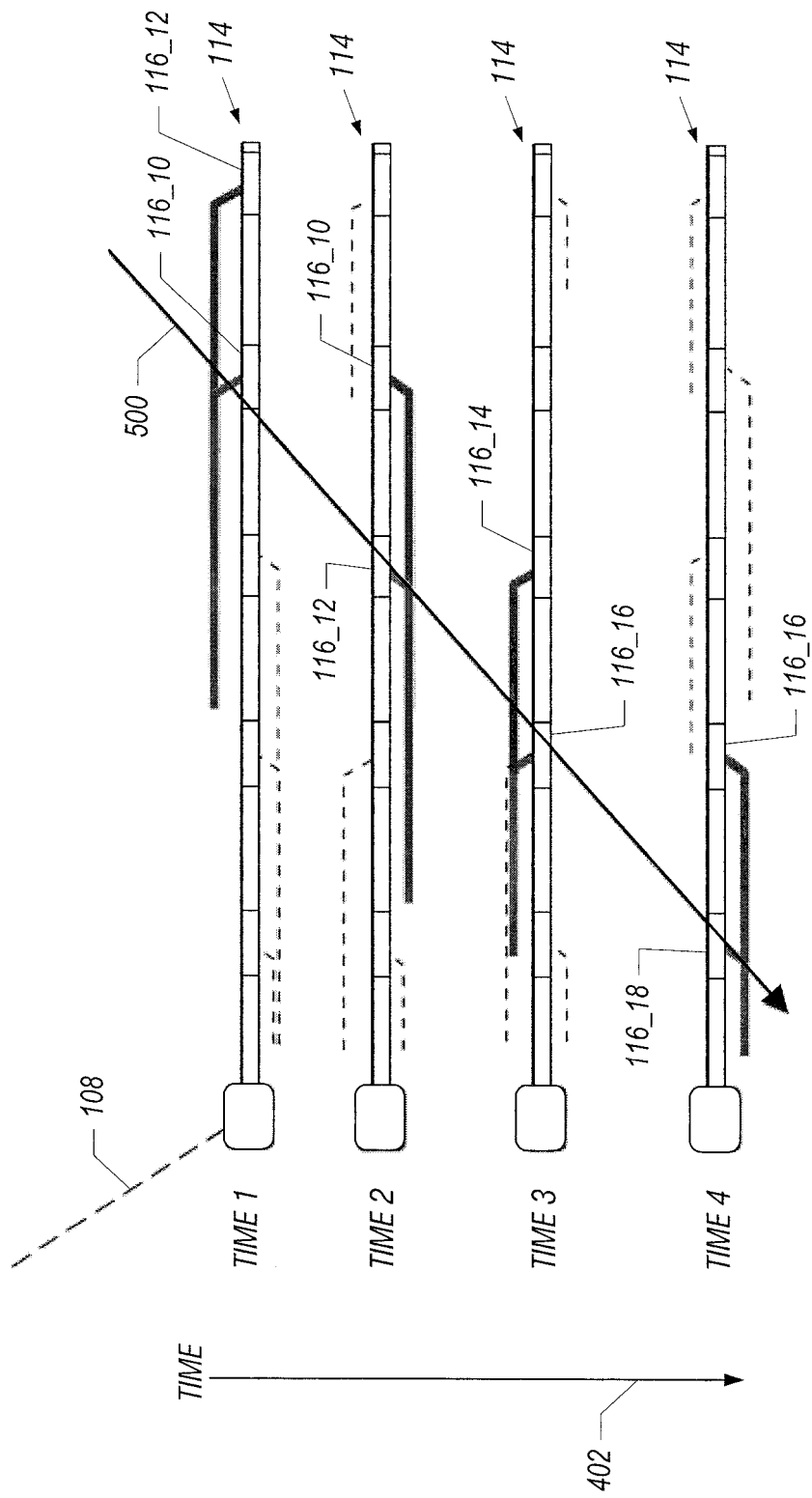

FIG. 5 shows another mode of operation, in which the source array 114 is dropped to the water bottom surface such that the source array 114 remains stationary. This mode of operation is desirable to maintain a fixed position of the source array 114. Not only is the position of the source array 114 maintained, but the pitch and yaw of the source array 114 is also maintained for a relatively long period of time.

Traditionally, for this mode of operation, if it is desired to provide EM signals at different locations, the source array would have to be moved, which is a time consuming and complex procedure. In accordance with some embodiments, by providing a relatively large number of electrodes of the source array 114, different subsets of these source electrodes can be activated to simulate movement of the source array 114 (indicated by arrows 500) even though the source array 114 is physically stationary.

FIG. 5 shows different subsets of source electrodes being activated over time for a stationary source array 114. Initially, at time 1, source electrodes 116_10 and 116_12 are activated (while the other electrodes are deactivated) to provide a first dipole at a first position. Later, at time 2, source electrode 116_12 is deactivated, and electrode 116_14 is activated, such that a dipole is developed across source electrodes 116_10 and 116_14. This provides a dipole at a second, different position.

Similarly, at times 3 and 4, further different subsets of electrodes are activated—at time 3, electrodes 116_14 and 116_16 are activated, while at time 4 electrodes 116_16 and 116_18 are activated.

Figure 6:
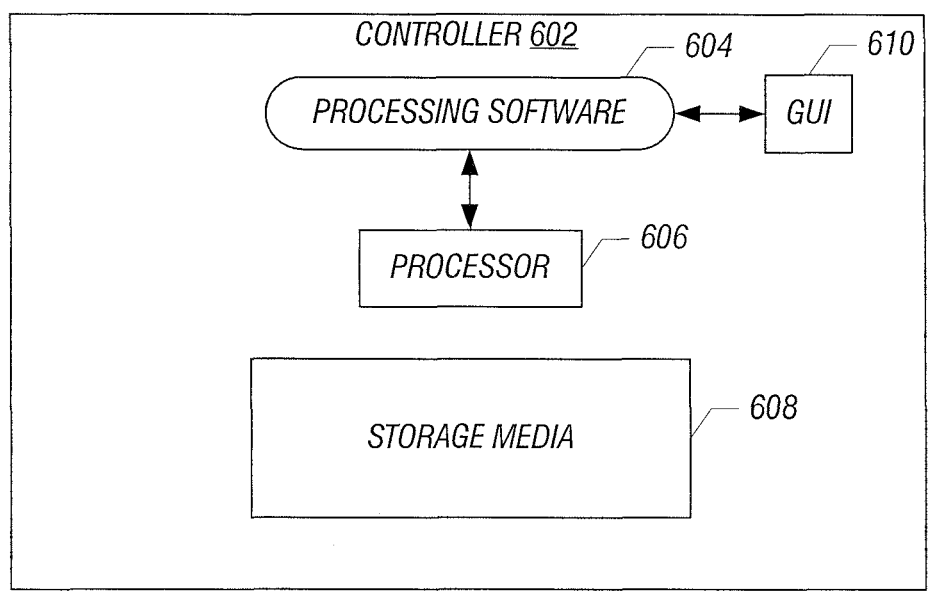
FIG. 6 is a block diagram of an exemplary controller that is able to control dynamic activation of electrodes in an EM source array according to an embodiment.

FIG. 6 shows a controller 602 that includes processing software 604 that can perform various tasks according to some embodiments, including controlling which subsets of electrodes to activate according to some embodiments. The processing software 604 is executable on a processor 606, which is connected to a storage media 608.

The controller 602 may be deployed on the marine vessel 102 of FIG. 1, or alternatively, the controller 602 may be deployed at a remote location on a land surface, for example. The processing software 604 can autonomously decide, based on various criteria and information pertaining to the source array 114 (such as the position of a source array or other environment conditions), which subsets of electrodes in the source array to activate to provide a desired EM radiation pattern for surveying a subterranean structure. In an alternative embodiment, the processing software 604 can provide a graphical user interface (GUI) 610 to allow a user to manually select which subsets of the electrodes of the source array to activate and deactivate.

Instructions of the processing software 604 are loaded for execution on the processor 606. The processor includes microprocessors, microcontrollers, processor modules or subsystems (including one or more microprocessors or microcontrollers), or other control or computing devices. As used here, a "processor" can refer to a single component or to plural components (e.g., one or multiple CPUs in one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing surveying of a subterranean structure, comprising:
   providing an electromagnetic (EM) source array having a plurality of electrodes; and
   dynamically and sequentially activating overlapping subsets of the plurality of electrodes to provide corresponding EM radiation patterns to survey the subterranean structure, wherein successive overlapping subsets share a common electrode.

2. The method of claim 1, where the surveying is marine surveying, the method further comprising moving the EM source array through a body of water.

3. The method of claim 1, wherein the EM source array is physically stationary when performing the surveying, and
wherein dynamically and sequentially activating the overlapping subsets of the plurality of electrodes causes virtual movement of the EM source array.

4. The method of claim 3, wherein providing the EM source array comprises dropping the EM source array to a water bottom surface.

5. The method of claim 3, wherein dynamically activating the different subsets of the plurality of electrodes causes production of radiation patterns from successively different parts of the EM source array.

6. The method of claim 5, wherein the EM source array comprises a first section having EM electrodes and a second section having EM electrodes, wherein the first section has a non-zero angle with respect to the second section,
wherein dynamically activating the different subsets of the plurality of electrodes comprises activating a first subset of the EM electrodes of the first section and a second subset of the EM electrodes of the second section, and
wherein the first and second subsets of EM electrodes form an effective source having a particular direction.

7. The method of claim 6, wherein the particular direction is a vertical direction.

8. The method of claim 6, wherein a first dipole is formed between a first activated EM electrode of the first section and a second activated EM electrode of the second section, and wherein a second dipole is formed between the second activated EM electrode and a third activated EM electrode of the second section.

9. The method of claim 8, wherein an effective dipole is formed based on a summation of the first and second dipoles.

10. The method of claim 1, wherein dynamically activating the different subsets of the plurality of EM electrodes is performed by a controller.

11. The method of claim 10, wherein the dynamically activating is performed by the controller in response to information regarding the source array.

12. The method of claim 10, wherein the dynamic activation of the different subsets is based on manual user input.

13. A method of performing marine surveying of a subterranean structure, comprising:

providing an electromagnetic (EM) source array having a plurality of electrodes;
moving the EM source array through a body of water; and
dynamically activating different subsets of the plurality of electrodes to provide corresponding EM radiation patterns to survey the subterranean structure,
wherein dynamically activating the different subsets of the plurality of electrodes is performed to correct for motion of the EM source array such that a virtually stationary EM source array is provided.

14. The method of claim 13, wherein dynamically activating the different subsets of the plurality of electrodes comprises incrementally activating successive subsets of the electrodes over time such that the successive subsets at different times are generally located at a target location.

15. An electromagnetic (EM) source array, comprising:
three or more electrodes;
wherein different subsets of the electrodes are dynamically activated to provide corresponding EM radiation patterns to survey a subterranean structure; and
a first antenna and a second antenna, wherein at least one of the electrodes is provided on the first antenna, and wherein at least two of the electrodes are provided on the second antenna, and wherein the first and second antennas are angled with respect to each other.

16. The EM source array of claim 15, wherein dynamic activation of the different subsets of the electrodes causes at least two dipoles to be developed, wherein the at least two dipoles are angled with respect to each other to form an effective dipole.

17. The EM source array of claim 16, wherein the effective dipole extends generally in a vertical direction.

18. An electromagnetic (EM) source array, comprising:
three or more electrodes;
wherein different subsets of the electrodes are dynamically activated to provide corresponding EM radiation patterns to survey a subterranean structure, wherein dynamic activation of the different subsets of the electrodes provides virtual movement of a stationary EM source array.

19. An electromagnetic (EM) source array, comprising:
three or more electrodes;
wherein different subsets of the electrodes are dynamically activated to provide corresponding EM radiation patterns to survey a subterranean structure, wherein dynamic activation of the different subsets of the electrodes provides a virtually stationary radiation pattern even though the EM source array is moving.

* * * * *